(12) United States Patent
Cornejo et al.

(10) Patent No.: US 11,505,458 B2
(45) Date of Patent: Nov. 22, 2022

(54) PROCESS FOR PRODUCING HYDROGEN AND GRAPHITIC CARBON FROM HYDROCARBONS

(71) Applicant: Hazer Group Limited, Perth (AU)

(72) Inventors: Andrew Cornejo, Winthrop (AU); Hui Tong Chua, Mount Claremont (AU)

(73) Assignee: HAZER GROUP LIMITED, Perth (AU)

( * ) Notice: Subject to any disclaimer, the term of this patent is extended or adjusted under 35 U.S.C. 154(b) by 659 days.

(21) Appl. No.: 15/563,430

(22) PCT Filed: Mar. 31, 2016

(86) PCT No.: PCT/AU2016/000115
§ 371 (c)(1),
(2) Date: Sep. 29, 2017

(87) PCT Pub. No.: WO2016/154666
PCT Pub. Date: Oct. 6, 2016

(65) Prior Publication Data
US 2018/0065850 A1 Mar. 8, 2018

(30) Foreign Application Priority Data
Mar. 31, 2015 (AU) .................. 2015901175

(51) Int. Cl.
*C01B 3/26* (2006.01)
*B01J 23/745* (2006.01)
(Continued)

(52) U.S. Cl.
CPC .............. *C01B 3/26* (2013.01); *B01J 8/0005* (2013.01); *B01J 8/26* (2013.01); *B01J 19/0013* (2013.01);
(Continued)

(58) Field of Classification Search
CPC .. B01J 19/0013; B01J 19/2445; B01J 19/245; B01J 2203/061; B01J 23/745;
(Continued)

(56) References Cited

U.S. PATENT DOCUMENTS 4,248,623 A * 2/1981 Papst ............... C21B 13/02
75/490
6,048,382 A 4/2000 Greenwalt
(Continued)

FOREIGN PATENT DOCUMENTS

JP 2006-326521 A 12/2006
JP 2006-290682 A 8/2011
(Continued)

OTHER PUBLICATIONS

Zhang et al. "Cementite Formation in CH4—H2—Ar Gas Mixture and Cementite Stability", ISIJ International, vol. 41 (2001), No. 4 (Year: 2001).*
(Continued)

*Primary Examiner* — Steven J Bos
*Assistant Examiner* — Syed T Iqbal
(74) *Attorney, Agent, or Firm* — Hunton Andrews Kurth LLP

(57) ABSTRACT

In accordance with the present invention, there is provided a process for producing hydrogen and graphitic carbon from a hydrocarbon gas comprising: contacting at a temperature between 600° C. and 1000° C. the catalyst with the hydrocarbon gas to catalytically convert at least a portion of the hydrocarbon gas to hydrogen and graphitic carbon, wherein the catalyst is a low grade iron oxide.

16 Claims, 9 Drawing Sheets

(51) Int. Cl.
  *B01J 8/26* (2006.01)
  *B01J 19/24* (2006.01)
  *C21B 15/00* (2006.01)
  *C01B 3/30* (2006.01)
  *C01B 32/205* (2017.01)
  *B01J 8/00* (2006.01)
  *B01J 19/00* (2006.01)

(52) U.S. Cl.
  CPC ......... *B01J 19/245* (2013.01); *B01J 19/2445* (2013.01); *B01J 23/745* (2013.01); *C01B 3/30* (2013.01); *C01B 32/205* (2017.08); *C21B 15/00* (2013.01); *B01J 2203/061* (2013.01); *C01B 2203/0277* (2013.01); *C01B 2203/1047* (2013.01); *C01B 2203/1241* (2013.01)

(58) Field of Classification Search
  CPC ... B01J 8/0005; B01J 8/26; C01B 2203/0277; C01B 2203/1047; C01B 2203/1241; C01B 32/20; C01B 32/205; C01B 3/26; C01B 3/30; C21B 15/00
  See application file for complete search history.

(56) References Cited

U.S. PATENT DOCUMENTS

2012/0258374 A1* 10/2012 Raston .................. C01B 32/205
                                                            429/411
2016/0156051 A1    6/2016 Chua et al.

FOREIGN PATENT DOCUMENTS

| WO | 2007136755 A3 | 11/2007 |
| WO | 2011029144 A1 | 3/2011 |
| WO | 2016154666 A1 | 10/2016 |

OTHER PUBLICATIONS

E. Heinzle "Technische Chemie I, WS:2009: Chemical Reactors", Technische Biochemie, 2009. p. 1-17 (Year: 2009).*
Wesolowski et al., "Self-assembly of thin carbon micro-shells through pulsed laser irradiation of a ferrocene/benzene solution" 48(18) J. Mater Sci (May 8, 2013), pp. 6212-6217.
Examiner's Report (CL 201800511), dated Sep. 26, 2019 (with translation).
Conclusion of patentability of invention (EA 201890506/28), dated May 23, 2018 (with translation).
Notification on necessity to submit additional materials (EA 201890506/28), dated Oct. 10, 2019 (with translation).
Notification on necessity to submit additional materials (EA 201890506/28), dated Jan. 29, 2020 (with translation).
First Exam Report (NZ 740136), dated Jul. 22, 2019.
Further Exam Report (NZ 740136), dated Sep. 4, 2019.
Second Written Opinion (SG 11201801483W), dated Jan. 3, 2020.
Grabke et al., "Effect of sulfur on the stability of cementite", 66(6) Steel Research (1995), pp. 254-258.
Pippel et al., "Microprocesses of metal dusting on iron", 66(5) Steel Research (1995), pp. 217-221.
Written Opinion (SG Appl. No. 11201707907S), dated Mar. 31, 2016.
Office Action (EA 1016453EAPOO), dated Mar. 14, 2019 and machine translation.
Substantive Examination Report Stage 1 (ID Appl. No. P00201707346) and machine translation.
Office Action (CL Appl. No. 201702468), dated Mar. 12, 2019 and machine translation.
Extended EP Search Report (EP 16771087.0), dated Oct. 8, 2018.
Balakrishnan et al. , "Hydrogen production from methane in the presence of red mud—making mud magnetic" 11 Green Chem. (2009), pp. 42-47.
Alharthi et al., "Iron ochre—a pre-catalyst for the cracking of methane", 89 J. Chem. Technol. Biotechnol. (2014), pp. 1317-1323.
First Examination Report (NZ 735781), dated Jul. 5, 2019.
Second Office Action (EA 201792048/28) & translation, dated Aug. 27, 2019.
Examination Report No. 1 (AU 2018101788), dated Feb. 15, 2019.
Examination Report No. 1 (AU Appl. No. 2016240393), dated Nov. 5, 2018.
Third Office Action (JP 2018-502293), dated Mar. 2, 2021 (with translation).
Substantive Examination Adverse Report (MY PI 2017703581), dated Sep. 9, 2020.
Substantive Exam Report (SA 517390046), dated Feb. 16, 2021 (w/translation).
Zhang et al "Cementite formation in CH4—H2—Ar gas mixture and cementite stability." ISIJ International, 2001, vol. 41(4) pp. 333-339.
Park et al "Characterization of phases formed in the iron carbide process by x-ray diffraction, Mossbauer, x-ray photoelectron spectroscopy, and Raman spectroscopy analyses." Metallurgical and Materials Transactions B, 2001, vol. 32(B), pp. 839-845.
Longbottom et al "Formation of cementite from titanomagnetite ore." ISIJ International, 2006, vol. 46(5), pp. 641-646.
International Search Report and Written Opinion dated Jun. 29, 2016 in PCT patent application No. PCT/AU2016/000115.

* cited by examiner

PROCESS FOR PRODUCING HYDROGEN AND GRAPHITIC CARBON FROM HYDROCARBONS

The present application is a National Stage Application of PCT/AU2016/000115, filed Mar. 31, 2016, hereby incorporated by reference, which claims priority to AU 2015901175, filed on Mar. 31, 2015.

FIELD OF THE INVENTION

The present invention relates to a process for producing hydrogen and graphitic carbon.

BACKGROUND ART

Hydrogen has many commercial uses, such as a clean and environmentally friendly alternative to fuel in internal combustion engines. Carbon, or more particularly graphite, is considered a key material in the emerging green technology market. It has been shown to be useful in energy storage, electrical conduction devices, catalyst supports, lubrication additives and modern electronics equipment. All references to carbon within this patent relates to the graphitic form of carbon, therefore these terms are used interchangeably throughout.

Conventional methods of producing hydrogen from fossil fuels however produce carbon dioxide (natural gas steam reforming and coal gasification) which is harmful to the environment.

Natural gas can be catalytically cracked into both hydrogen gas and solid carbon according to Equation (1).

$$CH_4 \rightarrow C + 2H_2 \qquad (1)$$

In such a process, the carbon deposits onto the surface of the catalyst and hydrogen gas evolves. There are a wide number of known catalysts for the process, including precious metals and carbon-based catalysts.

Whilst the above process is known, it has not been exploited commercially for a number of economic reasons. This primarily relates to the underlying catalyst costs, both in the initial supply, as well as costs in recycling and regenerating the catalyst. The vast majority of researchers in this area have utilised expensive and complex supported catalysts which, despite their high catalyst activity and product yield, result in extremely high catalyst turnover costs. These costs are a significant barrier to commercialising the use of such catalysts. There is a significant need for new and improved processes and catalysts for the catalytic conversion of hydrocarbons to hydrogen and a solid carbon which are stable and commercially valuable.

The preceding discussion of the background art is intended to facilitate an understanding of the present invention only. It should be appreciated that the discussion is not an acknowledgement or admission that any of the material referred to was part of the common general knowledge in Australia as at the priority date of the application.

SUMMARY OF THE INVENTION

In its broadest aspect, the invention provides a process for producing hydrogen and graphitic carbon from a hydrocarbon gas. In particular the present invention provides a process for catalytically converting hydrocarbon gas to hydrogen and graphitic carbon using a low grade catalyst.

Throughout this specification, unless the context requires otherwise, the term "low grade" will be understood to imply that the material that is not synthesised. As would be understood by a person skilled in the art, synthesised materials are produced by the chemical reaction of precursor materials. Standard synthesis techniques for catalysts which are excluded from the present invention are, for example, impregnating nano-sized catalytic elements onto inert supports. Whilst the term "low grade" does include naturally occurring materials, it should not be understood to exclude materials that have gone through physical beneficiation such as crushing and screening or classification.

Throughout the specification, unless otherwise stated, all pressures are provided in bar (gauge), with 0 bar being atmospheric pressure.

In accordance with the present invention, there is provided a process for producing hydrogen and graphitic carbon from a hydrocarbon gas comprising:
  contacting at a temperature between 600° C. and 1000° C. the catalyst with the hydrocarbon gas to catalytically convert at least a portion of the hydrocarbon gas to hydrogen and graphitic carbon,
wherein the catalyst is a low grade iron oxide.

Preferably, the pressure is greater than atmospheric pressure.

In one form of the present invention, the step of:
  contacting at a temperature between 600° C. and 1000° C. the catalyst with the hydrocarbon gas to catalytically convert at least a portion of the hydrocarbon gas to hydrogen and graphitic carbon,
more specifically comprises the steps of:
  reducing at least a portion of the iron oxide to iron;
  decomposing the hydrocarbon gas to produce hydrogen gas and an iron carbide intermediate; and
  precipitating graphitic carbon on the surface of the iron.

In one form of the present invention, the step of contacting at a temperature between 600° C. and 1000° C. the catalyst with the hydrocarbon gas is conducted at a pressure of 0 bar to 100 bar. Preferably, the step of contacting at a temperature between 600° C. and 1000° C. the catalyst with the hydrocarbon gas is conducted at a pressure of 0 bar to 50 bar. More preferably, the step of contacting at a temperature between 600° C. and 1000° C. the catalyst with the hydrocarbon gas is conducted at a pressure between 0 bar and 20 bar. Still preferably, the step of contacting at a temperature between 600° C. and 1000° C. the catalyst with the hydrocarbon gas is conducted at a pressure between 2 bar and 10 bar.

In one form of the present invention, the step of:
  contacting at a temperature between 600° C. and 1000° C. the catalyst with the hydrocarbon gas to catalytically convert at least a portion of the hydrocarbon gas to hydrogen and graphitic carbon,
is preferably conducted at a temperature of 700° C. to 950° C.

In a second form of the present invention, the step of:
  contacting at a temperature between 600° C. and 1000° C. the catalyst with the hydrocarbon gas to catalytically convert at least a portion of the hydrocarbon gas to hydrogen and graphitic carbon,
is preferably conducted at a temperature of 800° C. to 900° C.

In a third form of the present invention, the step of:
  contacting at a temperature between 600° C. and 1000° C. the catalyst with the hydrocarbon gas to catalytically convert at least a portion of the hydrocarbon gas to hydrogen and graphitic carbon,
is preferably conducted at a temperature of 650° C. to 750° C.

The inventors have discovered that the method of the present invention allows for the use of a low grade catalyst whilst still obtaining high conversion rates and yield.

Without wishing to be bound by theory, the inventors understand that the use of iron ore is advantageous because the metal species catalyses the decomposition reaction and the minerology of the ore exposes the catalytic elements to the hydrocarbon gas. It is understood by the applicant that the force of the precipitation of the graphite layers on the surface of the catalytic components is sufficient to fracture the coated catalyst particles apart from the catalyst, exposing further catalytic iron oxide. The catalyst is therefore self-supporting and does not require significant preparation prior to use.

In one form of the present invention, the hydrocarbon gas is methane. Preferably, the hydrocarbon gas is natural gas.

In one form of the present invention, the catalyst is milled to a particle size of less than 20 mm. Preferably, the catalyst is milled to a particle size of less than 15 mm. More preferably, the catalyst is milled to a particle size of less than 10 mm. Still preferably, the catalyst is milled to a particle size of less than 5 mm. Still preferably, the catalyst is milled to a particle size of less than 1 mm. Still preferably, the catalyst is milled to a particle size of less than 0.5 mm. Still preferably, the catalyst is milled to a particle size of less than 0.1 mm.

In one form of the present invention, the step of contacting at a temperature between 600° C. and 1000° C. the catalyst with the hydrocarbon gas is performed within a pressurised reactor. Preferably, the pressurised reactor is selected from the group of static, moving or fluidized bed reactors.

In one form of the present invention, the catalyst is disposed on a substantially horizontal surface of the reactor and subjected to a transverse flow of hydrocarbon gas. In a second form of the present invention, the catalyst is suspended in a fluidised bed reactor and hydrocarbon gas is flowed through the fluidised bed.

In one form of the present invention, the step of contacting the catalyst with the hydrocarbon gas is performed in a plurality of pressurised reactors arranged in series.

In one form of the present invention, the arrangement of the reactors in series allows gas to flow from a first reactor to a subsequent reactor(s). Preferably, each subsequent reactor in the series operates at a lower pressure than the preceding reactor, allowing gas to travel to reactors of lower pressure. In the series arrangement, any unreacted hydrocarbon gas passes to subsequent reactors of lower pressure to contact additional catalyst for further processing and more complete conversion of the hydrocarbon gas to hydrogen and graphitic carbon.

In an alternative form of the present invention, the arrangement of the reactors in series allows catalyst to flow from a first reactor to a subsequent reactor. Preferably, each subsequent reactor in the series is operated at a higher pressure than the preceding reactor, allowing catalyst to travel to reactors of higher pressure. At low pressures, some of the catalyst may remain only partially deactivated. In the series arrangement, partially deactivated catalyst passes to subsequent reactors of higher pressure to be contacted by additional hydrocarbon gas for further processing and the production of a higher purity graphitic carbon. It is envisaged by the applicant that the subsequent reactors may be provided below the preceding reactors such that the flow of the catalyst between the reactors can be assisted by gravity. The applicant has termed this as a cascade-style arrangement.

In one form of the present invention, two pressurised reactors are used in series.
  the first reactor is at a pressure between 15 and 25 bar;
  the second reactor is at a pressure between 0 and 1 bar;

In an alternate form of the present invention, three pressurised reactors are used in series. Where three pressurised reactors are used in series,
  the first reactor is at a pressure between 15 and 25 bar; the second reactor is at a pressure between 5 and 10 bar; and
  the third the first reactor is at a pressure between 0 and 1 bar.

In an alternate form of the present invention, four pressurised reactors are used in series. Where four pressurised reactors are used in series,
  the first reactor is at a pressure between 20 and 30 bar;
  the second reactor is at a pressure between 5 and 15 bar;
  the third reactor is at a pressure between 4 and 6 bar; and
  the fourth reactor is at a pressure between 0 and 1 bar.

In an alternate form of the present invention, five pressurised reactors are used in series. Where five pressurised reactors are used in series,
  the first reactor is at a pressure between 25 and 35 bar;
  the second reactor is at a pressure between 10 and 20 bar;
  the third reactor is at a pressure between 5 and 10 bar;
  the fourth reactor is at a pressure between 4 and 6 bar; and
  the fifth reactor is at a pressure between 0 and 1 bar.

The utility and economic drivers of the conversation of the hydrocarbon gas to hydrogen and graphitic carbon are the competing kinetic and thermodynamic drivers of the reaction. As discussed previously, the hydrocarbon gas decomposes which ultimately results in graphitic carbon precipitating onto the surface of metallic particles of the catalyst. The precipitation continues until the methane can no longer penetrate the enveloping graphite and reach the catalyst. Kinetically, the reaction is driven by increased reaction pressure, as this better enables methane to diffuse into the graphite structure that envelops the active catalyst surfaces, leading to greater catalyst utilisation. Increased catalyst utilisation also leads to a higher purity graphite product. The competing factor is that the thermodynamics of the reaction preferentially indicate undertaking the reaction at lower pressure. At higher pressures there is an increased gas volume of the products (2 moles of hydrogen produced per mole of methane feed) which leads to an equilibrium position that is more favoured towards the initial reagents over the products. This equilibrium position limits the % of methane feed that can be converted to hydrogen. This is known in the art as the thermodynamic equilibrium limit (TEL), which decreases as the reaction pressure is increased.

By providing a plurality of reactors in series, the inventors have found that the competing kinetic and thermodynamic drivers of the reaction can be controlled by altering the pressure of each subsequent reactor. This allows high catalyst activity at higher pressure but also results in high conversion of the hydrocarbon gas feed in the reactors of lower pressure. The benefit of using multiple reactors in series is it allows the use of elevated reaction pressures to increase the product yield per unit catalyst utilised (catalyst utility) whilst maintaining high methane conversion efficiencies (TEL).

In one form of the present invention where multiple reactors are used in a series which allows gas flow between reactors, each reactor is provided with unreacted catalyst. In this arrangement, each of the reactors are loaded with unreacted catalyst prior to being contacted with the hydrocarbon gas. A portion of the hydrocarbon gas is converted to hydrogen and graphitic carbon in the reactor with the highest pressure. The first reactor has an associated TEL, resulting in an under-conversion of the hydrocarbon gas to hydrogen gas and carbon. The resultant hydrocarbon gas/hydrogen mixture transfers to one or more successive lower pressure reactors. The lower pressure reactors have a higher associated TEL, enabling further conversion of hydrocarbon gas to hydrogen gas and carbon. When unreacted catalyst is provided in each reactor, the applicant has termed this arrangement a parallel gas multiple pressure reactor (parallel gas MPR).

In a second form of the present invention where multiple reactors are used in a series which allows catalyst flow between reactors, unreacted hydrocarbon gas is provided to each reactor. In this arrangement, hydrocarbon gas is continuously flowed through the reactor. Unreacted catalyst is provided in the lowest pressure reactor, which following the catalytic conversion of the methane, produces a partially deactivated catalyst. The partially deactivated catalyst is transferred into the next reactor of higher pressure in the series for further catalytic conversion of methane. The higher pressure of the reactor allows for further deactivation of the catalyst. The transfer of the partially deactivated catalyst repeats along multiple reactors of increasing pressure. When unreacted hydrocarbon gas is provided in each reactor, the applicant has termed this arrangement a parallel catalyst multiple pressure reactor (parallel catalyst MPR).

In a third form of the present invention the multiple reactors are arranged in a series which allows for both the hydrocarbon gas and catalyst to flow between reactors in opposite directions. In this arrangement, unreacted catalyst is provided in the lowest pressure reactor and unreacted hydrocarbon gas is provided in the highest pressure reactor. The catalyst is transferred between the chambers of increasing pressure counter-currently to the gas flow between the chambers. The applicant has termed this arrangement a counter-current multiple pressure reactor (counter-current MPR). The partially deactivated catalyst retains activity in the higher pressure reactors, and the resultant graphite product has higher purity (as % of mass) with correspondingly higher value.

The inventors have found that the counter-current MPR arrangement allows for more complete conversion of the hydrocarbon gas and a higher purity graphitic carbon product. As there is no catalyst flow in parallel gas MPRs or no gas flow in parallel catalyst MPRs, the design is much simpler than the counter-current MPR.

In one form of the present invention, the process is configured to preferentially produce either higher purity hydrogen or graphitic carbon. As would be understood by a person skilled in the art, both the hydrogen and graphitic carbon products are always produced in constant proportion of 1:3 (hydrogen to graphitic carbon) on a mass basis as dictated by the basic reaction stoichiometry. Despite this, emphasis can be given to increase the purity of one of the products over the other.

In one form of the present invention where the process is adapted to preferentially produce higher purity hydrogen, the process comprises:
contacting the catalyst with the hydrocarbon gas at a temperature between 800° C. and 900° C. at atmospheric pressure to catalytically convert at least a portion of the hydrocarbon gas to hydrogen and graphitic carbon.
Preferably, the process is conducted in a single fluidised bed reactor.

If higher purity hydrogen is preferred then emphasis is given to conditions which increase methane conversion efficiencies. For higher purity hydrogen in a single stage reactor this means typically lower pressures and higher temperatures, as this allows for the highest conversion as per thermodynamics. The higher conversion is at the expense of higher catalyst consumption and lower purity graphite as a result of smaller yields per unit of catalyst.

In one form of the present invention, where the process is adapted to preferentially produce higher purity graphitic carbon, the process comprises:
contacting the catalyst with the hydrocarbon gas at a temperature between 650° C. and 950° C. at a pressure between 2 and 100 bar to catalytically convert at least a portion of the hydrocarbon gas to hydrogen and graphitic carbon.
Preferably, the process in conducted in a fluidised bed reactor.

If higher purity graphitic carbon is preferred, then emphasis is given to the conditions which increase the catalyst utility. The quality of graphite is a function of the purity with respects to the non-carbon inclusions and the degree of crystallinity. For higher purity graphitic carbon in a single stage reactor this means typically larger range of temperatures and higher pressures, as this allows for the highest utilisation of the catalyst.

In accordance with a further aspect of the present invention, there is provided a method for the beneficiation of catalytic metal containing ore, the method comprising contacting at a temperature between 600° C. and 1000° C. the catalytic metal containing ore with a hydrocarbon gas to form a carbon-coated metal species.

Preferably, the pressure is greater than atmospheric pressure.

In one form of the present invention, the carbon-coated metal species is a graphite coated metal species.

In one form of the present invention, the step of:
contacting at a temperature between 600° C. and 1000° C. the catalytic metal containing ore with a hydrocarbon gas to form a carbon-coated metal species,
more specifically comprises the steps of:
reducing at least a portion of the catalytic metal containing ore to catalytic metal species;
decomposing the hydrocarbon gas to produce hydrogen gas and an catalytic metal carbide intermediate; and
precipitating graphitic carbon on the surface of the catalytic metal.

Without wishing to be bound by theory, it is understood by the applicant that the force of the precipitation of the graphite layers on the surface of the catalytic components is sufficient to fracture the coated catalyst particles apart from the remaining ore gangue. Once the coated catalyst particles have fractured, further catalytic components within the ore are exposed to the hydrocarbon gas.

In one form of the present invention the catalytic metal containing ore is iron ore.

As discussed previously, the metal species in iron ore catalyses the decomposition reaction. The majority of the iron on the Earth's crust is as a form called 'banded iron formation (BIF)' which consists of layers of iron separated by layers of noniron minerals, typically $SiO_2$. The benefit of this arrangement is that the gas always has access to the iron layers because they are never fully encased in non-iron species. In addition, iron ore has relatively high concentration of iron. By contrast, the catalytic elements in the other ores are too low in concentration and are not stratified in layers, therefore are often encapsulated by non-catalytic species and the process gas is unable to contact them to react.

In one form of the present invention, the process is conducted in a pressurised dusting reactor. Preferably, the catalytic metal containing ore is contacted with the hydrocarbon gas within the pressurised dusting reactor to produce nano/micron sized graphite coated metal particles. Advantageously, the larger (>1 mm) non-catalytic gangue species are left unchanged. Due to this size difference, physical separation techniques can be employed to separate out the graphite coated metal particles from the gangue.

In one form of the present invention the dusting reactor is a fluidized bed reactor. The inventors have discovered that the use of a fluidised bed reactor has the advantage of simultaneously separating the nano/micron sized graphite coated metal particles from the larger gangue species during the beneficiation process. The smaller sized graphite coated metal particles are entrained in the process gas stream and removed from the reactor via this gas stream, whereas the larger gangue particles remain within the reactor. In one form of the present invention, the smaller graphite coated metal species are removed from the gas stream by a gas-solid separator that allows the particles to settle. The gangue can be continuously removed from the dusting reactor via gravity by periodic discharging.

In one form of the present invention, the step of:
contacting at a temperature between 600° C. and 1000° C. the catalytic metal containing ore with a hydrocarbon gas to form a carbon-coated metal species,
is preferably conducted at a temperature of 700° C. to 950° C.

In one form of the present invention, the step of:
contacting at a temperature between 600° C. and 1000° C. the catalytic metal containing ore with a hydrocarbon gas to form a carbon-coated metal species,
is preferably conducted at a temperature of 800° C. to 900° C.

In one form of the present invention, the step of:
contacting at a temperature between 600° C. and 1000° C. the catalytic metal containing ore with a hydrocarbon gas to form a carbon-coated metal species,
is preferably conducted at a temperature of 650° C. to 750° C.

In one form of the present invention, the step of:
contacting at a temperature between 600° C. and 1000° C. the catalytic metal containing ore with a hydrocarbon gas to form a carbon-coated metal species,
is conducted at a pressure of 0 bar to 100 bar.

In one form of the present invention, the step of:
contacting at a temperature between 600° C. and 1000° C. the catalytic metal containing ore with a hydrocarbon gas to form a carbon-coated metal species,
is conducted at a pressure of 0 bar to 50 bar.

In one form of the present invention, the step of:
contacting at a temperature between 600° C. and 1000° C. the catalytic metal containing ore with a hydrocarbon gas to form a carbon-coated metal species,
is conducted at a pressure of 0 bar to 20 bar.

In one form of the present invention, the step of:
contacting at a temperature between 600° C. and 1000° C. the catalytic metal containing ore with a hydrocarbon gas to form a carbon-coated metal species,
is conducted at a pressure of 0 bar to 10 bar.

In one form of the present invention, the graphite is removed from the graphite coated metal species by contacting at temperature of 700° C. to 900° C. the graphite coated metal species with hydrogen gas. Preferably, the step of contacting at temperature of 700° C. to 900° C. the graphite coated metal species with hydrogen gas is performed in a pressurised reduction reactor.

In one form of the present invention, the removal of the graphite from the graphite coated metal species is performed in a pressurised reduction reactor at a pressure of 0 bar to 100 bar. It is understood by the inventors that higher pressures favour the removal of the graphite. In a preferred form of the present invention, the removal of the graphite from the graphite coated metal species is performed in a pressurised reduction reactor at a pressure of 10 bar to 20 bar.

The step of contacting at temperature of 700° C. to 900° C. the graphite coated metal species with hydrogen gas produces methane. In one form of the present invention, the methane is recycled to produce hydrogen. More specifically, the step of recycling the methane comprises,
contacting at a temperature between 600° C. and 1000° C. a low grade iron ore catalyst with the methane to catalytically convert at least a portion of the methane to hydrogen and graphitic carbon.

In one form of the present invention, the hydrogen produced in the step of recycling the methane is used in the step of contacting at temperature of 700° C. to 900° C. the graphite coated metal species with hydrogen gas to remove the graphite from the graphite coated metal species.

When beneficiating iron ore, the removal of the graphite within the reduction reaction leaves the metal species in high purity form, often as iron metal.

BRIEF DESCRIPTION OF THE FIGURES

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DETAILED DESCRIPTION OF THE PREFERRED EMBODIMENTS OF THE INVENTION

Figure 1:
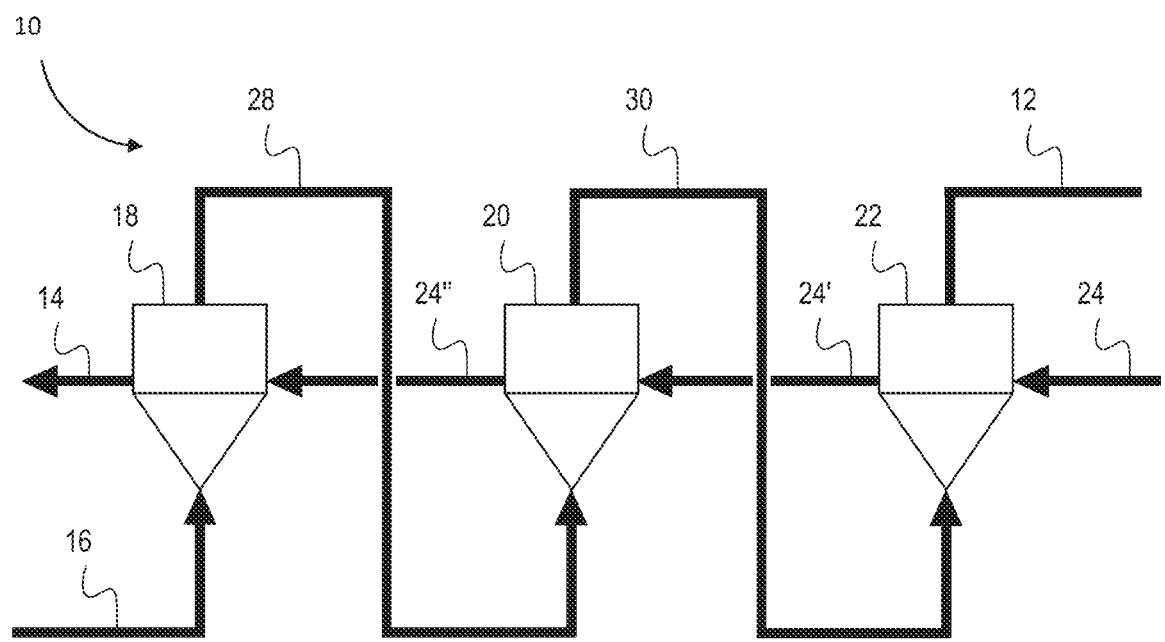
FIG. 1 shows a schematic representation of the process for producing hydrogen and graphite in accordance with the counter-current MPR of the present invention.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness. None of the cited material or the information contained in that material should, however be understood to be common general knowledge.

Manufacturer's instructions, descriptions, product specifications, and product sheets for any products mentioned herein or in any document incorporated by reference herein, are hereby incorporated herein by reference, and may be employed in the practice of the invention.

The present invention is not to be limited in scope by any of the specific embodiments described herein. These embodiments are intended for the purpose of exemplification only. Functionally equivalent products, formulations and methods are clearly within the scope of the invention as described herein.

The invention described herein may include one or more range of values (e.g. size, concentration etc). A range of values will be understood to include all values within the range, including the values defining the range, and values adjacent to the range which lead to the same or substantially the same outcome as the values immediately adjacent to that value which defines the boundary to the range.

Throughout this specification, unless the context requires otherwise, the word "comprise" or variations such as "comprises" or "comprising", will be understood to imply the inclusion of a stated integer or group of integers but not the exclusion of any other integer or group of integers.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Features of the invention will now be discussed with reference to the following non-limiting description and examples.

In a general form, the invention relates to a process for producing hydrogen and graphitic carbon from a hydrocarbon gas. In particular the present invention provides a process for catalytically converting hydrocarbon gas to hydrogen and graphitic carbon using a low grade iron oxide-containing catalyst.

The hydrocarbon gas may be any gas stream that comprises light hydrocarbons. Illustrative examples of hydrocarbon gas include, but are not limited to, natural gas, coal seam gas, landfill gas and biogas. The composition of the hydrocarbon gas may vary significantly but it will generally comprise one or more light hydrocarbons from a group comprising methane, ethane, ethylene, propane and butane.

In a preferred embodiment of the invention, the hydrocarbon gas is natural gas.

The process for producing hydrogen and graphitic carbon from natural gas comprises:

contacting at a temperature between 600° C. and 1000° C. the catalyst with the hydrocarbon gas to catalytically convert at least a portion of the hydrocarbon gas to hydrogen and graphitic carbon, wherein the catalyst is a low grade iron oxide.

Referring to FIG. 1, a counter-current MPR process 10, using three fluidised bed reactors, for producing hydrogen 12 and graphitic carbon 14 from a hydrocarbon gas, for example natural gas, 16 is described.

In the embodiment shown in FIG. 1, the process utilises three reactors operating at varying pressures, a high pressure reactor 18 at 18 bar, a medium pressure reactor 20 at 6 bar and a low pressure reactor 22 at 1 bar. The temperatures of the reactors are each 850° C. The reactors 18, 20 and 22 are arranged in series, such that hydrogen and unreacted hydrocarbon natural gas is transferred between adjacent reactors. i.e. from the high pressure reactor 18 to the medium pressure reactor 20 and from the medium pressure reactor 20 to the low pressure reactor 22.

Each reactor 22, 20 and 18 is respectively loaded with low grade iron oxide catalyst, for example iron ore 24", 24' and 24. Where 24 is fresh unreacted catalyst and 24', 24" are progressively more utilised, having more graphitic carbon attached and less overall catalytic activity remaining. Stream 14 contains only trace amounts of fully spent catalyst, with the vast majority (>90% wt at reaction temperatures of 850° C.) of this stream being graphitic carbon.

The amount of catalyst required for this reaction is relative to the quantity of hydrogen required, the process conditions and the type of catalyst. A 2000 m$^3$/hr hydrogen production plant operating under the conditions above with 3 reactors would require approximately 14 kg/hr of iron.

Natural gas 16 is directed through the reactors in series from the high pressure reactor 18, to the medium pressure reactor 20 and low pressure reactor 22. Each reactor converts a portion of the natural gas into hydrogen, with each successive gas stream 28, 30, 12 containing higher portions of hydrogen. Fresh natural gas 16 initially contacts the catalyst 24" in the high pressure reactor 18 at a temperature of 850° C. and a pressure of 18 bar to convert a portion of the natural gas into hydrogen, thus the corresponding gas stream 28 being a mixture comprising of hydrogen and unreacted natural gas. This reactor also deposits some graphitic carbon onto catalyst 24" contributing to the total graphitic carbon in steam 14.

Gas stream 28 is transferred to the medium pressure reactor 20 where it contacts the catalyst 24' at a temperature of 850° C. and a pressure of 6 bar to convert the natural gas into hydrogen and carbon. The lower pressure of the medium pressure reactor 20 enables conversion of the gas stream 28, thus contributing to the total hydrogen steam 12. The process deposits graphitic carbon onto the catalyst 24' and in so contributes to the total graphitic carbon stream 14. A portion of the natural gas in gas stream 28 remains unreacted and mixes with the produced hydrogen gas to form gas stream 30.

Gas stream 30 is transferred to the low pressure reactor 22 where it contacts the catalyst 24 at a temperature of 850° C. and a pressure of 1 bar (atmospheric pressure). The lower pressure of the low pressure reactor 22 enables the thermodynamic equilibrium of the reaction to favour the decomposition direction of the reaction, thereby allowing more conversion of the second gas stream 30 into carbon and hydrogen gas. The process deposits graphitic carbon onto the catalyst 24, and in so contributes to the total graphitic carbon stream 14. This reactor also contributes to the hydrogen gas in the total hydrogen steam 12 which exits the reactor for use or further processing.

Theoretical empirical calculations dictate that the reactors 18, 20, 22 have conversion efficiencies of 54%, 75% and 94% respectively, and correspondingly the gas streams 28, 30 and 12 have hydrogen concentrations of 70%, 86% and 97% wt respectively.

The proportion of graphitic carbon in the iron oxide streams 24, 24', 24" and 14 are 0%, 91%, 95%, 98% respectively.

In the embodiment shown in FIG. 1, when the natural gas 16 contacts the catalyst 24 at a high temperature to produce hydrogen gas 12 and carbon 14, the catalyst 24 depletes to form a partially deactivated catalyst 24'. The partially deactivated catalyst 24' is transferred between the reactors counter-currently to the natural gas 16 flow. The catalyst 24 is introduced into the lowest pressure reactor 22, and is subsequently passed to higher pressure reactors. The partially deactivated catalyst 24' would therefore retain activity in the higher pressure reactor 20, and the resultant graphitic carbon 14 has the higher carbon-purity (as % of mass) with correspondingly higher value.

Figure 2:
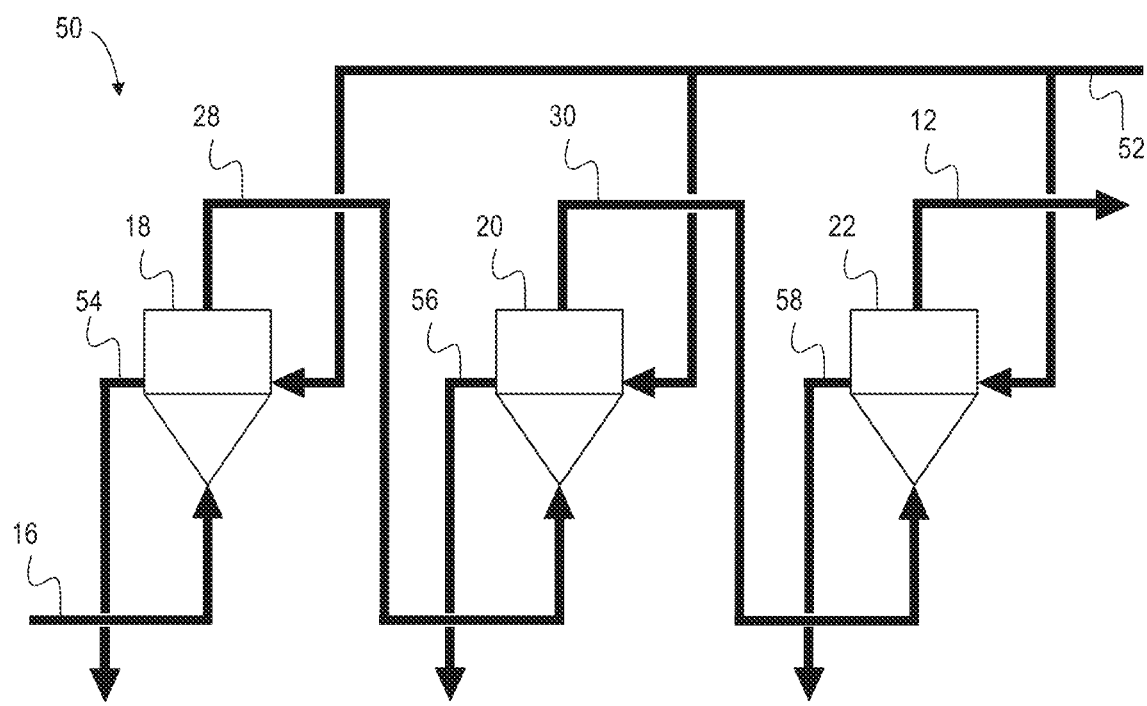
FIG. 2 shows a schematic representation of the process for producing hydrogen and graphite in accordance with the parallel gas MPR of the present invention.

In FIG. 2, a parallel gas MPR process 50 is shown. Parallel gas MPR process 50 shares common features with counter-current MPR process 10 and like numerals denote like parts.

In the embodiment shown in FIG. 2, the process utilises three reactors operating at varying pressures, a high pressure reactor 18 at 18 bar, a medium pressure reactor 20 at 6 bar and a low pressure reactor 22 at 1 bar. The temperatures of the reactors are each 850° C. The reactors 18, 20 and 22 are arranged in series, such that unreacted hydrocarbon natural gas can be transferred between adjacent reactors. i.e. from the high pressure reactor 18 to the medium pressure reactor 20 and from the medium pressure reactor 20 to the low pressure reactor 22.

Each reactor 18, 20 and 22 is respectively loaded with an iron ore catalyst 52. In contrast to the counter-current MPR process 10 shown above, each reactor 22, 20 and 18 is provided with unreacted catalyst 52 prior to being contacted with the hydrocarbon gas.

The amount of catalyst required for this reaction is relative to the quantity of hydrogen required, the process conditions and the type of catalyst. A 2000 m³/hr hydrogen production plant operating under the conditions above with 3 reactors would require approximately 27 kg/hr of iron.

Natural gas 16 is directed through the reactors in series from the high pressure reactor 18, to the medium pressure reactor 20 and low pressure reactor 22. Each reactor converts a portion of the natural gas into hydrogen, with each successive gas stream 28, 30, 12 containing higher portions of hydrogen. Unreacted natural gas 16 initially contacts at a temperature of 850° C. and a pressure of 18 bar the catalyst 34 in the high pressure reactor 18 to convert a portion of the natural gas into hydrogen, producing a gas stream 28 which is a mixture of hydrogen and unreacted natural gas. Graphite is also deposited onto catalyst 34, producing partial graphite stream 54.

Gas stream 28 passes to the medium pressure reactor 20 where it contacts at a temperature of 850° C. and a pressure of 6 bar the catalyst 52 to convert the natural gas into hydrogen and carbon. The lower pressure of the medium pressure reactor 20 enables further conversion of the gas stream 28, thus contributing to the total hydrogen steam 12. The process deposits carbon onto the catalyst 52, producing partial graphite stream 56. A portion of the natural gas in gas stream 28 remains unreacted and mixes with the produced hydrogen gas to form gas stream 30.

Gas stream 30 passes to the low pressure reactor 22 where it contacts at a temperature of 850° C. and a pressure of 1 bar (atmospheric pressure) the catalyst 52. The lower pressure of the low pressure reactor 22 enables the thermodynamic equilibrium of the reaction to favour the decomposition direction of the reaction, thereby allowing conversion of the natural gas in second gas stream 30 into carbon and hydrogen gas. The process deposits carbon onto the catalyst 52, producing partial graphite stream 58. This reactor also contributes to the hydrogen gas in the total hydrogen steam 12, and exits the reactor for use or further processing.

Partial graphite streams 54, 56 and 58 contain a mixture of unreacted iron ore and graphitic material. Given the varying pressures of the each reactor 22, 20 and 18 each partial graphite stream will have different conversion rates. Partial graphite stream 58 will have the highest iron impurity, followed by partial graphite stream 56 and then partial graphite stream 54.

Empirically, the reactors 18, 20, 22 have conversion efficiencies of 54%, 75% and 94% respectively, and correspondingly the gas streams 28, 30 and 12 have hydrogen concentrations of 70%, 86% and 97% wt respectively.

Figure 3:
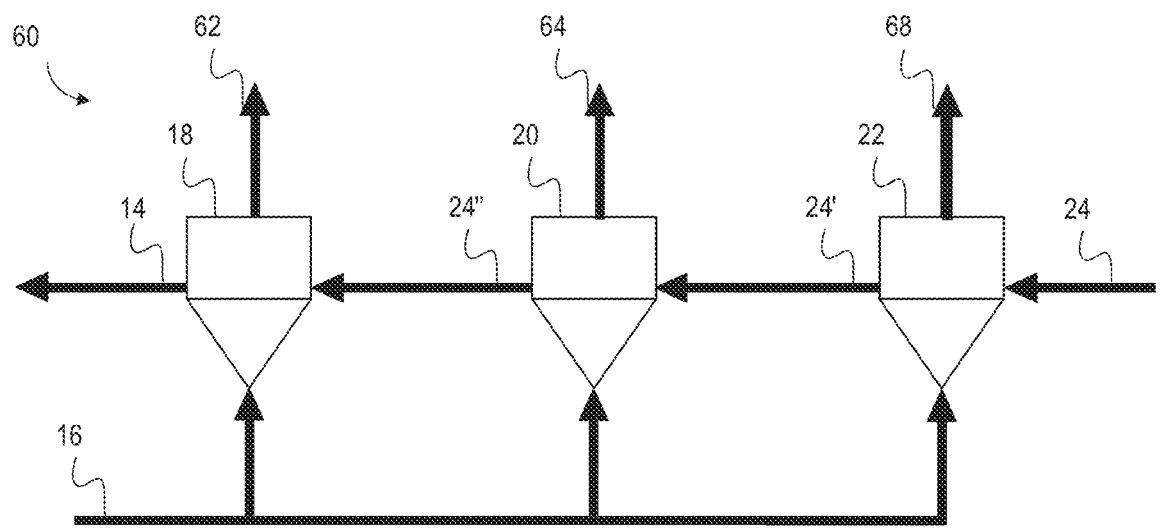
FIG. 3 shows a schematic representation of the process for producing hydrogen and graphite in accordance with the parallel catalyst MPR of the present invention

In FIG. 3, a parallel catalyst MPR process 60 is shown. Parallel MPR process 60 shares common features with counter-current MPR process 10 and like numerals denote like parts.

In the embodiment shown in FIG. 3, the process utilises three reactors operating at varying pressures, a high pressure reactor 18 at 18 bar, a medium pressure reactor 20 at 6 bar and a low pressure reactor 22 at 1 bar. The temperatures of the reactors are each 850° C.

Each reactor 18, 20 and 22 is respectively loaded with a low grade iron oxide containing catalyst, for example iron ore 24", 24' and 24. Where 24 is unreacted catalyst and 24', 24" are progressively more utilised, having more carbon attached and less overall catalytic activity remaining. Stream 14 contains only trace amounts of fully spent catalyst, with the vast majority (>90% wt at reaction temperatures of 850° C.) of this stream being graphite.

The reactors 18, 20 and 22 are arranged in series, such that catalyst 24", 24' and 24 is transferred between adjacent reactors. i.e. from the low pressure reactor 22 to the medium pressure reactor 20 and from the medium pressure reactor 20 to the high pressure reactor 18.

In contrast to the counter-current MPR process 10 shown above, unreacted natural gas 16 is provided to each reactor 22, 20 and 18.

In the embodiment shown in FIG. 3, when the natural gas 16 contacts the catalyst 24 at a high temperature to produce hydrogen gas 12 and carbon 14, the catalyst 24 depletes to form a partially deactivated catalyst 24'. The partially deactivated catalyst 24', 24" is transferred between the reactors. The catalyst 24 is introduced into the lowest pressure reactor 22, and is subsequently passed to higher pressure reactors 20, 18. The partially deactivated catalyst 24' would therefore retain activity in the higher pressure reactor 20, and the resultant carbon 14 has the higher carbon-purity (as % of mass) with correspondingly higher value.

Natural gas 16 contacts the catalyst 24 in the low pressure reactor 22 at a temperature of 850° C. and a pressure of 18 bar to convert a portion of the natural gas 16 into hydrogen to produce a gas stream 68, being a mixture comprising of hydrogen and unreacted natural gas. Graphitic carbon is deposited onto catalyst 24 to produce catalyst 24' contributing to the total carbon in stream 14.

Natural gas 16 contacts the catalyst 24' in the medium pressure reactor 20 at a temperature of 850° C. and a pressure of 6 bar to of the natural gas 16 into hydrogen to produce a gas stream 64, being a mixture comprising of hydrogen and unreacted natural gas. Graphitic carbon is deposited onto catalyst 24' to produce catalyst 24" contributing to the total carbon in stream 14.

Natural gas 16 contacts the catalyst 24" in the high pressure reactor 18 at a temperature of 850° C. and a pressure of 18 bar to convert a portion of the natural gas 16 hydrogen to produce a gas stream 62, being a mixture comprising of hydrogen and unreacted natural gas. Graphitic carbon is deposited onto catalyst 2" to produce catalyst graphitic carbon 14.

Figure 4:
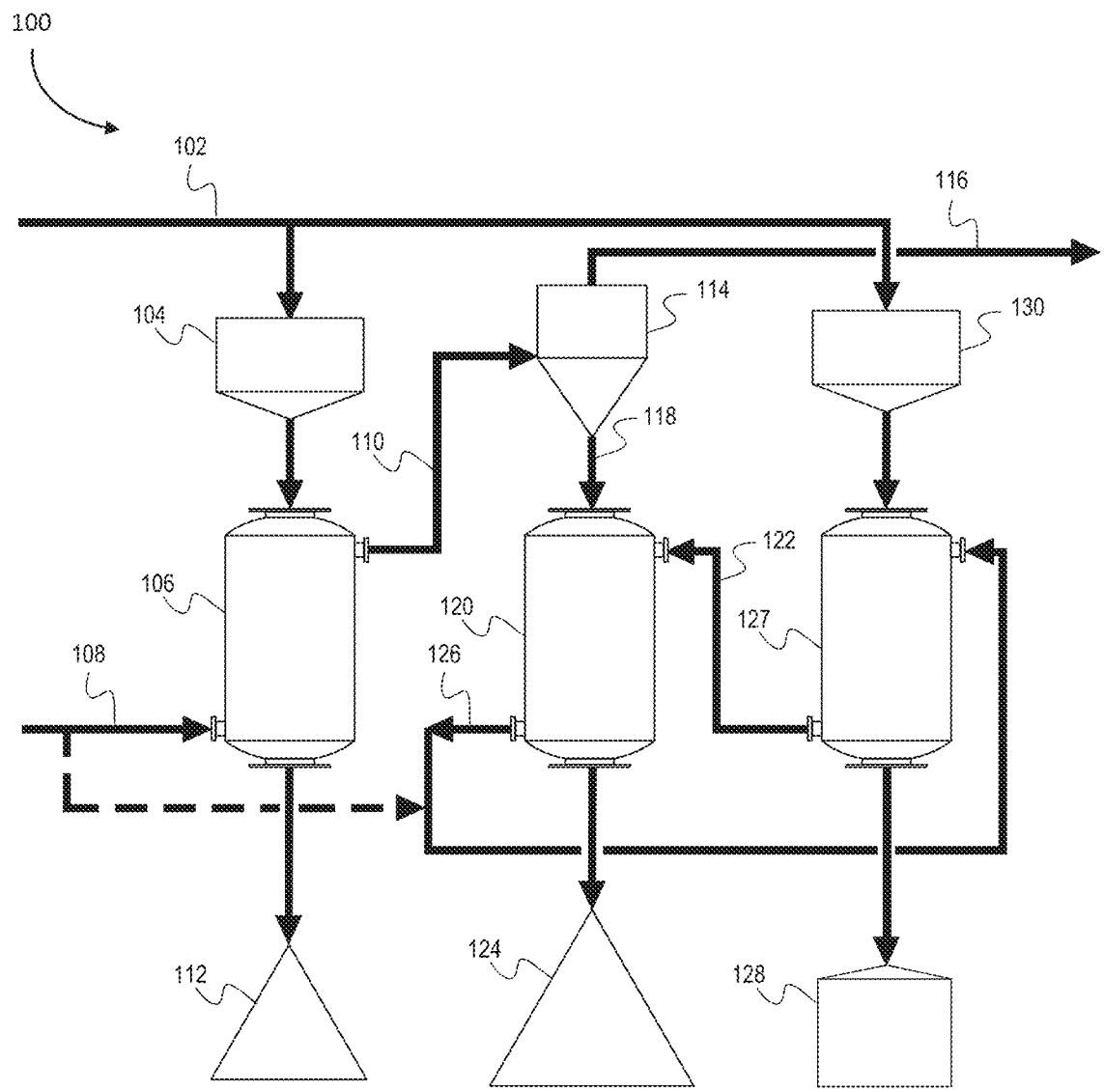
FIG. 4 is a schematic representation of the process for the beneficiation of a catalytic metal containing ore in accordance with a first embodiment.

Referring to FIG. 4, a process 100 for the beneficiation of a catalytic metal containing ore for example iron ore 102 is described.

Low grade iron ore 102 is passes through a surge bin 104 and into a dusting reactor 106. In the dusting reactor 106, the iron ore 102 is contacted at a temperature between 850° C. and a pressure between 10 and 20 bar with a hydrocarbon gas 108 to produce a graphite coated iron stream 110 and a waste stream 112 comprising of larger (>1 mm) gangue particles. The size difference between the graphite coated iron stream 110 and a waste stream 112 separates the streams. The graphite coated iron stream 110 is passed through a gas/solids separator 114 to separate the gas stream 116 from the solids stream 118, which is passed to a reduction reactor 120.

In the reduction reactor 120, the graphite coated iron particles of the solids stream 118 contact with hydrogen gas 122 at a temperature between 800° C. and 900° C. and a pressure between 10 and 20 bar in order to remove the carbon coating, leaving a iron concentrate stream 124. The reaction also forms a methane gas stream 126, which is recycled into other parts of the process. In the embodiment shown in FIG. 2, the methane gas stream 126 is contacted at a temperature between 800° C. and 900° C. with further iron ore 102 passed through a surge bin 130 in a hydrogen reactor 127 to produce hydrogen gas 122 and a graphite powder 128. As shown in FIG. 4, the hydrogen gas 122 is transferred back into the reduction reactor 120.

EXAMPLES

Example 1

The use of iron ore as the catalyst for the economical production of hydrogen and graphite via the thermo-catalytic decomposition of methane.

Experimental Details

The present invention provides a method which enables the use of low grade iron oxide as a catalyst for the decomposition of methane. In order to demonstrate the catalytic activity of the low grade iron oxide catalyst of the present invention, samples of low grade iron oxide were compared to high grade iron oxide samples. Two types of high grade iron oxide were tested: hematite (99%, <5 μm, Sigma-Aldrich) and magnetite (95%, <5 μm, Sigma-Aldrich); as well as two iron ore samples: Hematite ore (Pilbara mine) and goethite ore (Yandi mine). The ore samples were milled to <150 μm but otherwise untreated. The 'as received' compositional data, particle size distribution, and surface area of all the samples are detailed in Table 1.

TABLE 1

Compositional, particle size and surface area data for the iron oxide samples.

| Iron Oxide Type | Fe % | P % | Si % | Al % | Ca Oxide % | Mn Oxide % | Mg Oxide % | Ti Dioxide % | S % | K Oxide % | Cl % | Balance Oxide % | $D_{10}$ um | $D_{50}$ um | $D_{90}$ um | Surface area $m^2/g$ |
|---|---|---|---|---|---|---|---|---|---|---|---|---|---|---|---|---|
| Analytical Grade $Fe_2O_3$ | 69.9 | — | — | — | — | — | — | — | — | — | — | 30.1 | 0.2 | 0.4 | 165 | 5.37 |
| Analytical Grade $Fe_3O_4$ | 72.3 | — | — | — | — | — | — | — | — | — | — | 27.7 | 0.17 | 1.42 | 3.24 | 6.24 |
| Hematite ore (Pilbrara) | 62.9 | 0.1 | 4.0 | 2.2 | 0.0 | 0.1 | 0.0 | 0.1 | 0.0 | 0.0 | 0.0 | 30.5 | 3.2 | 44.5 | 141.0 | 7.62 |
| Goethite ore (Yandi mine) | 57.9 | 0.0 | 5.5 | 1.4 | 0.0 | 0.0 | 0.0 | 0.1 | 0.0 | 0.0 | 0.0 | 34.9 | 3.1 | 47.8 | 156.8 | 29.76 |

Each sample was placed in a separate single stage reactor. The reactors were vertical ½" diameter stainless steel (SS316 Swagelok) tube, with ⅜" quartz tube internal liners. The quartz tube internal liners reduce the catalytic effect of the stainless steel reactor walls by restricting contact with the reacting methane gas. 20 g catalyst samples were contained within a ⅜" 'test-tube like' quartz chamber.

Figure 5:
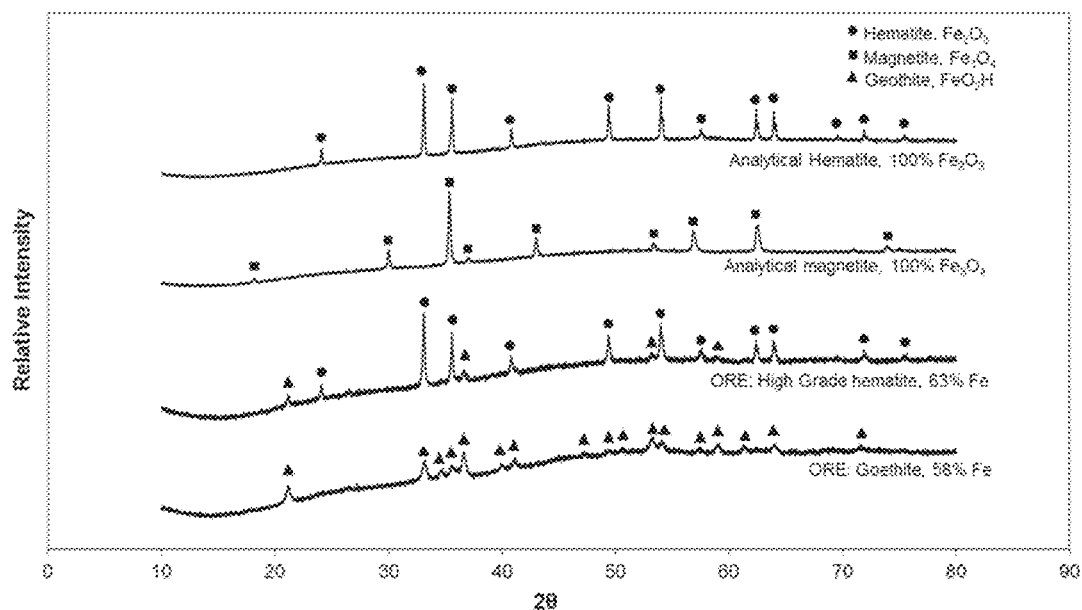
FIG. 5 is a graphical representation of XRD plots of the analytical grade iron oxides and iron ore catalyst samples.

The XRD plots of the high grade iron oxide catalyst samples, namely analytical grade (hematite and magnetite) and low grade iron oxide catalyst samples (hematite ore and goethite ore) are shown in FIG. 5.

Each sample was reacted at temperatures ranging from 750-950° C., using 10 sccm pure methane (UHP), and a reaction pressure between 1-9 bar (absolute). After complete deactivation (approximately 19 hr) the reaction was terminated and the samples were cooled with 20 sccm of pure nitrogen (UHP). The resulting carbon (and embedded catalyst particles) was weighed to determine the total carbon yield per gram of iron catalyst used.

Figure 6:
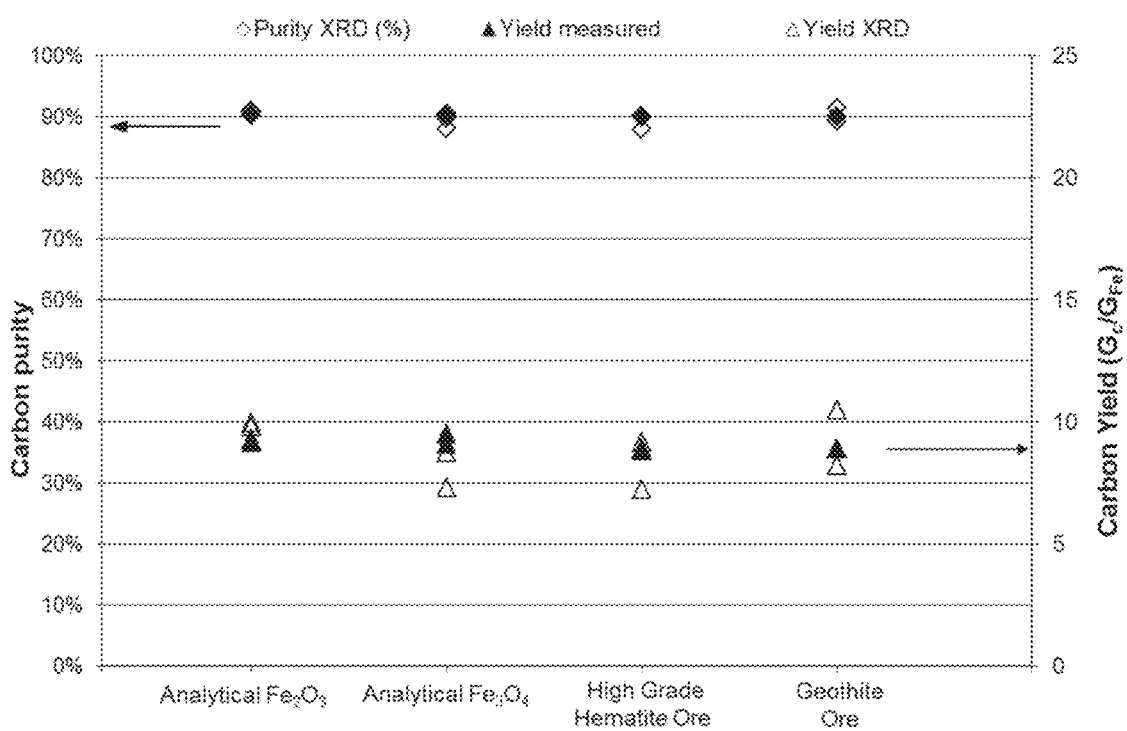
FIG. 6 is a graphical representation of carbon purity (wt %) and carbon yield (grams of carbon per gram of iron—GC/GFe) of iron oxide catalysts post reaction.

FIG. 6 shows the results of these experiments at reaction conditions of 850° C. and atmospheric pressure. The results show that the low grade iron ore samples performed almost as well as the high grade oxides, with carbon yields ranging from 9.2 to 8.9 grams of carbon per gram of iron, corresponding to carbon purities of 90 wt % to 89 wt % respectively. These values are shown to closely correlate with the quantitative XRD derived values, with differences of less than 2 wt % (represented as hollow shapes in FIG. 6).

As would be understood by a person skilled in the art, a common way to increase the activity of a catalyst is to make it very high purity in order to increase the reactive area. Iron oxide catalysts, such as the high grade iron oxide sample tested must be must be specifically synthesized to have a purity of >99%. The results of this experiment indicate that the particular process condition of the present invention allow for the use of a low grade catalyst, whilst still obtaining high conversion rates and yield.

Example 2

Figure 7:
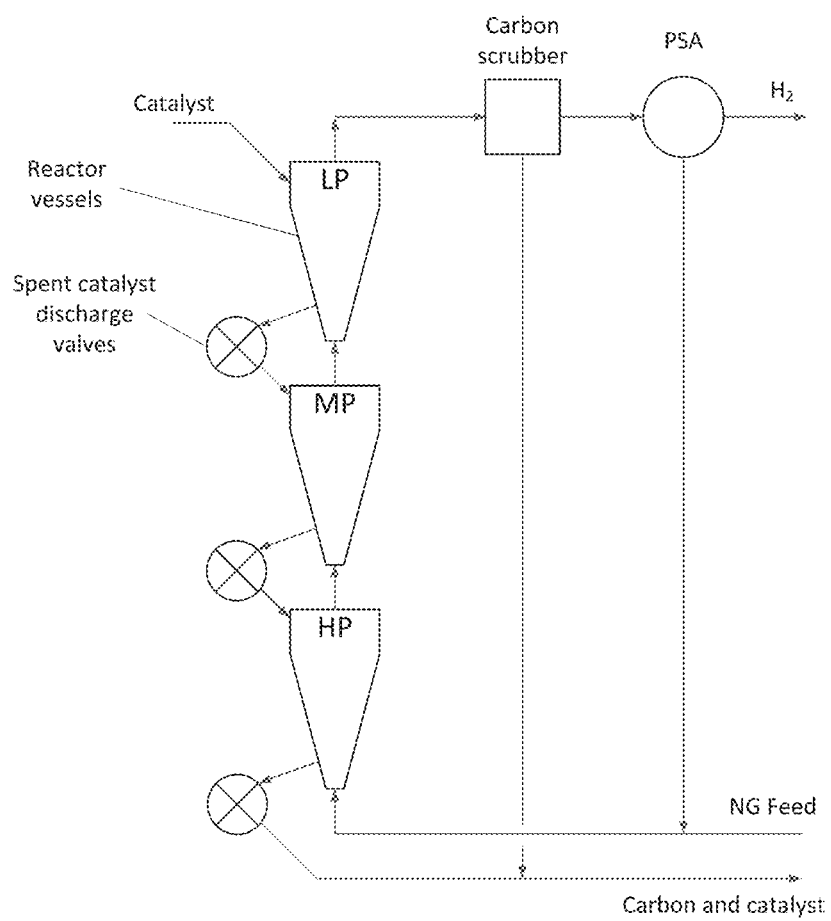
FIG. 7 is a schematic representation of a three stage cascading counter-flow system.

Thermo-catalytic methane decomposition using counter-current MPR.
Counter-current.
A three reactor counter-current MPR was set up in a cascade arrangement as shown in the schematic of FIG. 7.

Experimental evaluation of the counter-current MPR system was undertaken using a static (non-continuous) system. This was done by testing the effect of pressure on the methane conversion efficiency and the carbon yield. The results confirmed that an increase in pressure lowered the methane conversion, and increased the carbon yield, and conversely a lower pressure increase of the methane conversion and lowered the total carbon yield.

Experimental Details
Effect of reaction pressure on the methane conversion limit.

Figure 8:
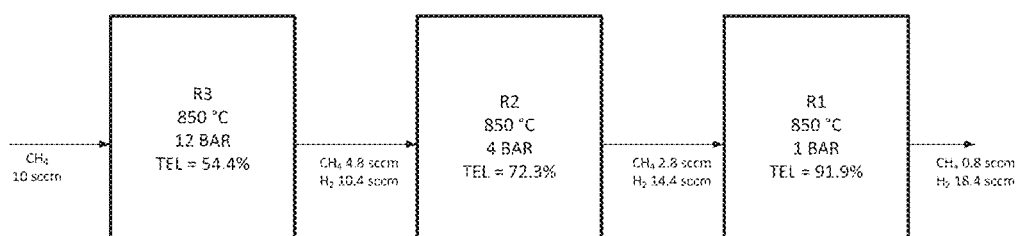
FIG. 8 shows a schematic representation of the experimental conditions used to test the methane conversion of a MPR system with 3 reactors in series using static fixed bed reactors.
Figure 8:
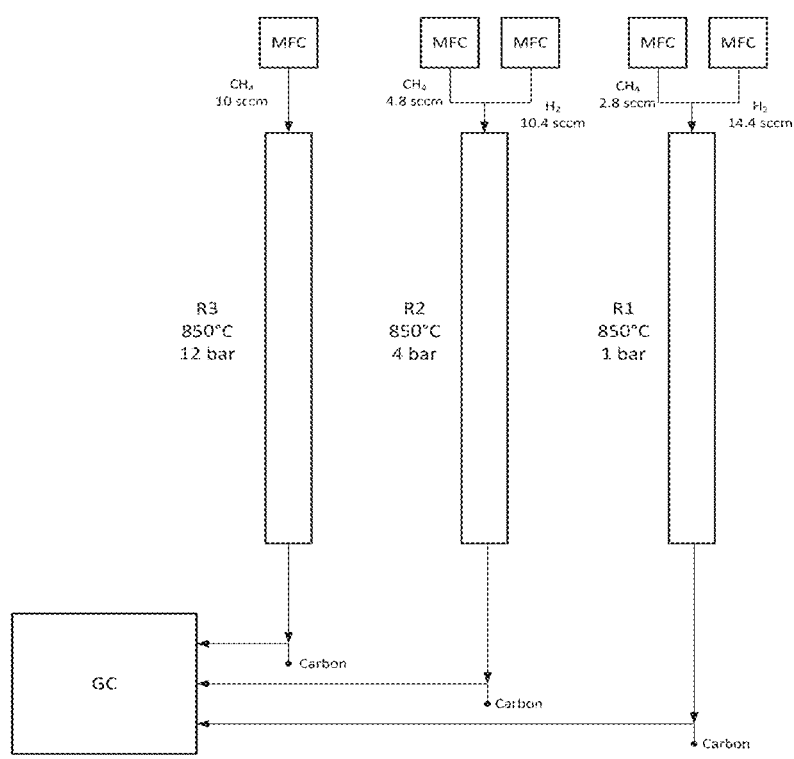

The reactor set-up comprised three independent reactor stages (3×½" OD 316SS Swagelok, 700 mm length) with different set back-pressures (12 bar, 4 bar and atmospheric) and an isothermal temperature of 850° C. Instead of linking the reactors in series, each was fed and analysed independently in order to assess their individual performances. The feed gas compositions of each reactor were set to simulate their operation in series, where each of the reactors were operating at their theoretical maximum possible conversion at the reaction pressure (Table 2). The performance of each stage was determined by monitoring the effluent from each reactor using a Gas Chromatograph (GC). A schematic of this process is shown in FIG. 8. An excess amount of iron oxide was used to simulate continuous catalyst flow conditions within this static system to allow a momentary glimpse of the expected steady-state continuous operation.

TABLE 2

Process conditions for the MPR experimental trial

| Reactor Stage | R1 | R2 | R3 |
|---|---|---|---|
| Pressure (bar) | 1 | 4 | 12 |
| Temperature (° C.) | 850 | 850 | 850 |
| Theoretical TEL (%) | 91.9 | 72.3 | 54.4 |
| Methane input flow (sccm) | 2.8 | 4.8 | 10 |
| Hydrogen input flow (sccm) | 14.4 | 10.4 | 0 |

Figure 9:
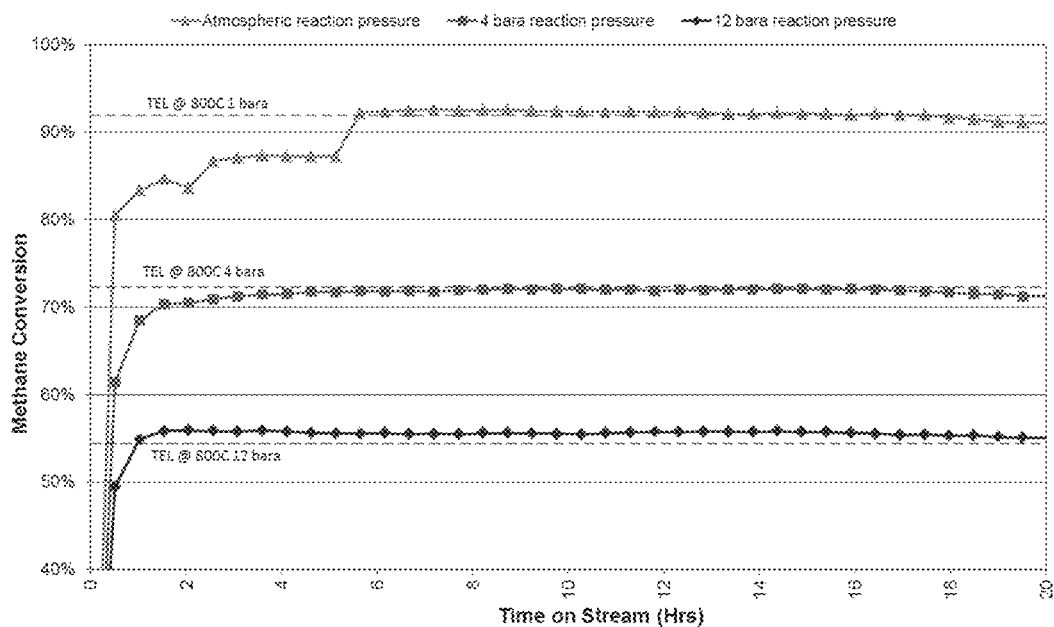
FIG. 9 is a graphical representation of the methane conversion results of hematite catalyst for different reaction pressures.

The results obtained from this experiment are shown in FIG. 9 and are in good correlation with theoretical expectations and validate the theory. All three reactor stages correlated well with the expected thermodynamic equilibrium limit (shown as dashed lines) for a period exceeding 20 hr, after which the reaction was terminated. It is clear that the high hydrogen concentration did not affect the ability for the reaction to attain conversions at the thermodynamic equilibrium limit when the MPR system was used.

These results indicate that a continuous MPR system can sustain stable conversions at the thermodynamic equilibrium limit regardless of the level of hydrogen.

Effect of Pressure on Product Yield.

The effects of reaction pressure were tested using 20 mg of catalyst at pressure intervals of 1 bar, with all other reaction conditions remaining the same as the previous experiments (namely 850° C., 20 sccm methane, auto-reduction, 19 hr duration).

Figure 10:
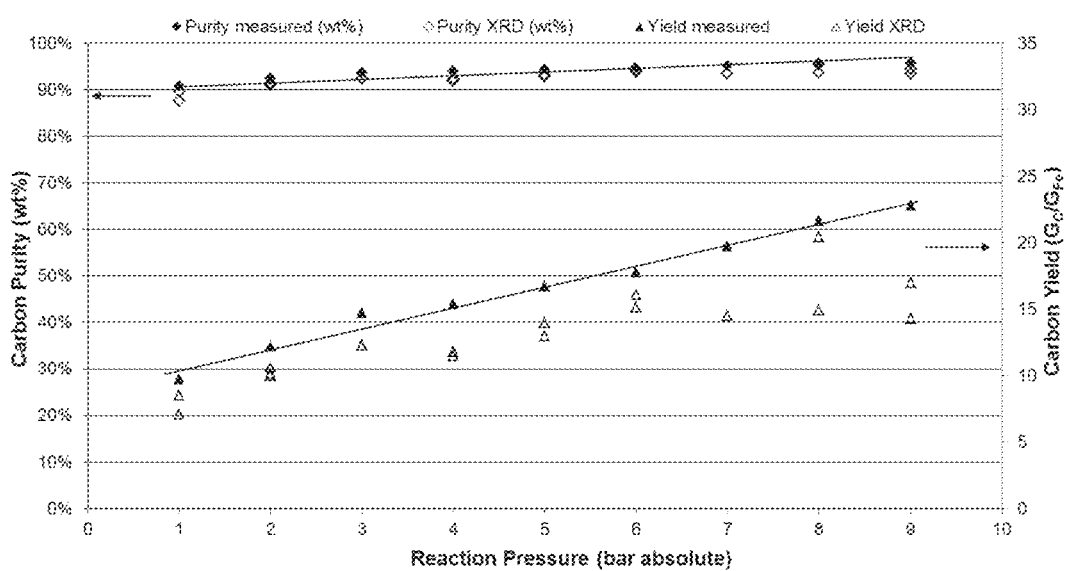
FIG. 10 is a graphical representation of carbon purity (wt %) and carbon yield (gram of carbon per gram of iron—GC/GFe) of hematite catalyst for different reaction pressures.

The results indicate that there is a positive linear relationship between the reaction pressure and the total carbon yield. The profile, as shown in FIG. 10 shows that the carbon yield per gram of iron increases from ~9 g to 22 g across the pressure range of atmospheric pressure to 9 bar absolute, corresponding to carbon purities of ~9096% respectively.

Empirical Catalyst Flow Rate Calculations

The overall feasibility of the MPR systems are dependent on the balance of the mass flows. This is of particular importance for the counter flow MPR because of the strict interdependence of the catalyst mass flow with (1) the number of reactor pressure stages, (2) the range of pressures, and (3) the catalyst carbon capacity profile. An empirical mass balance calculation was done to determine the feasibility of attaining balance.

The catalyst flow rate within each reactor can be determined by dividing the carbon deposition rate by the catalyst utility for each reactor; which are both bounded by the reactor pressure range.

$$\dot{M}_{cat(Rn)} = \frac{\dot{M}_{c(Rn)}}{\Delta C_{(Rn)}}$$

Where $\dot{M}_{cat(Rn)}$ is the mass flow rate of catalyst, $\dot{M}_{c(Rn)}$ is the carbon deposition rate, and $\Delta C_{(Rn)}$ is the catalyst utility through reactor 'Rn'.

Parallel MPR

Parallel flow MPRs have the advantage of design simplicity and fewer constraints determining the number of stages and pressure limits.

Counter-Current MPR

Figure 11:
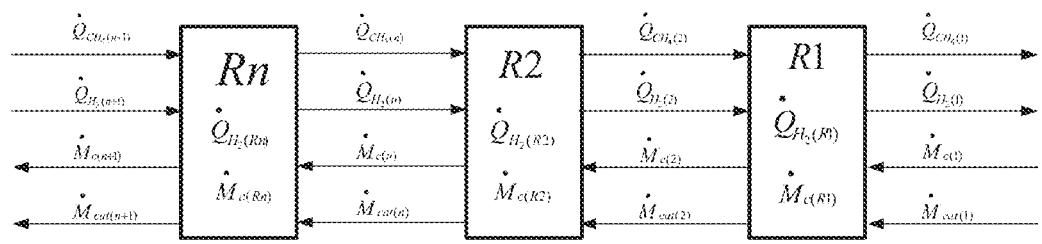
FIG. 11 is schematic shows a schematic representation of the variables for the mass balance calculation of a counter-current MPR system.

The biggest constraint for the counter-current MPR arrangement is balancing the catalyst mass flow between all reactor stages in order to enable continuous operation. The catalyst flow rate required at each stage is dependent on (1) the number of reactor stages and (2) the catalyst carbon capacity profile relative to pressure. This balance is illustrated in FIG. 11.

The purpose of this calculation is to determine the number of pressure stages that balances the catalyst flow rate between all stages, for a given catalyst carbon capacity profile and reaction temperature (assuming isothermal conditions).

If the catalyst mass flow rate is set so that it is fully deactivated when exiting each reactor stage, the catalyst utility at each stage is the difference between the total catalyst utility at the reactor pressure and the adjacent lower pressure reactor. Thus:

$$\Delta C_{(Rn)} = C_n - C_{n-1}$$

Where 'n' is the reactor number (n=1 is the lowest pressure reactor).

The catalyst mass flow rate through each reactor stage then becomes:

$$\dot{M}_{cat(Rn)} = \frac{\left(\frac{P}{RT}\right)_{STP} \dot{Q}_{CH_4(I)} \cdot [\xi_{Rn} - \xi_{Rn+1}] \cdot 12}{\left[\alpha \cdot \frac{K_T}{4}\left(\frac{1}{\xi_{Rn}^2} - 1\right) + \beta\right] - \left[\alpha \cdot \frac{K_T}{4} \cdot \left(\frac{1}{\xi_{Rn-1}^2} - 1\right) + \beta\right]}$$

Where P, R, and T are the STP pressure, gas constant and temperature respectively, $\dot{Q}_{CH_4(I)}$ is the initial methane feed rate, $\xi_{Rn}$, is the TEL at reactor 'n', $\alpha$ and $\beta$ are coefficients relating to the pressure effects on the carbon capacity, $K_T$ is the equilibrium constant at temperature 'T'.

For a reactor system with only one reactor (n=1), reactor (n−1) and (n+1) reactor stages do not exist; thus this can be simplified to:

$$\dot{M}_{cat(R1)} = \frac{\left(\frac{P}{RT}\right)_{STP} \cdot \dot{Q}_{CH_4(I)} \cdot \xi_{R1} \cdot 12}{\alpha \cdot \frac{K_T}{4} \cdot \left(\frac{1}{\xi_{R1}^2} - 1\right) + \beta}$$

Similarly for a two stage reactor, reactor (n−1) and (n+2) reactors do not exist, and for a three stage reactor (n−1) and (n+3) reactors do not exist.

Catalyst Mass Flow Balance

For a multistage process to be continuous the catalyst flow rate must equate:

$$\dot{M}_{cat(R1)} = \dot{M}_{cat(R2)}$$

Thus for a Two Stage Reactor $$\frac{\left(\frac{P}{RT}\right)_{STP} \cdot \dot{Q}_{CH_4(I)} \cdot [\xi_{R1} - \xi_{R2}] \cdot 12}{\alpha \cdot \frac{K_T}{4} \cdot \left(\frac{1}{\xi_{R1}^2} - 1\right) + \beta} =$$

$$\frac{\left(\frac{P}{RT}\right)_{STP} \dot{Q}_{CH_4 I} \cdot \xi_{R2} \cdot 12}{\left[\alpha \cdot \frac{K_T}{4} \cdot \left(\frac{1}{\xi_{R2}^2} - 1\right) + \beta\right] - \left[\alpha \cdot \frac{K_T}{4} \cdot \left(\frac{1}{\xi_{R1}^2} - 1\right) + \beta\right]}$$

For isothermal conditions this can be simplified to:

$$\frac{\xi_{R1} - \xi_{R2}}{\left(\frac{1}{\xi_{R1}^2} - 1\right) + \frac{\beta \cdot 4}{K_T \cdot \alpha}} = \frac{\xi_{R2}}{\frac{1}{\xi_{R2}^2} - \frac{1}{\xi_{R1}^2}}$$

If reactor 'IR1' is operating at atmospheric pressure and operating at the TEL then $\xi_{R1}$ is known, and $\xi_{R2}$ can be solved using the above equation. This solution would solve for the pressure required for reactor 2 to equate the catalyst flow rate.

This can similarly be done for larger numbers of reactors:

Three Reactor Stages:

$$\frac{\xi_{R1} - \xi_{R2}}{\left(\frac{1}{\xi_{R1}^2} - 1\right) + \frac{\beta \cdot 4}{K_T \cdot \alpha}} = \frac{\xi_{R2} - \xi_{R3}}{\frac{1}{\xi_{R2}^2} - \frac{1}{\xi_{R1}^2}} = \frac{\xi_{R3}}{\frac{1}{\xi_{R3}^2} - \frac{1}{\xi_{R2}^2}}$$

Four Reactor Stages:

$$\frac{\xi_{R1} - \xi_{R2}}{\left(\frac{1}{\xi_{R1}^2} - 1\right) + \frac{\beta \cdot 4}{K_T \cdot \alpha}} = \frac{\xi_{R2} - \xi_{R3}}{\frac{1}{\xi_{R2}^2} - \frac{1}{\xi_{R1}^2}} = \frac{\xi_{R3} - \xi_{R4}}{\frac{1}{\xi_{R3}^2} - \frac{1}{\xi_{R2}^2}} = \frac{\xi_{R4}}{\frac{1}{\xi_{R4}^2} - \frac{1}{\xi_{R3}^2}}$$

The above can then be extrapolated to additional reactor stages.

Results

Figure 12:
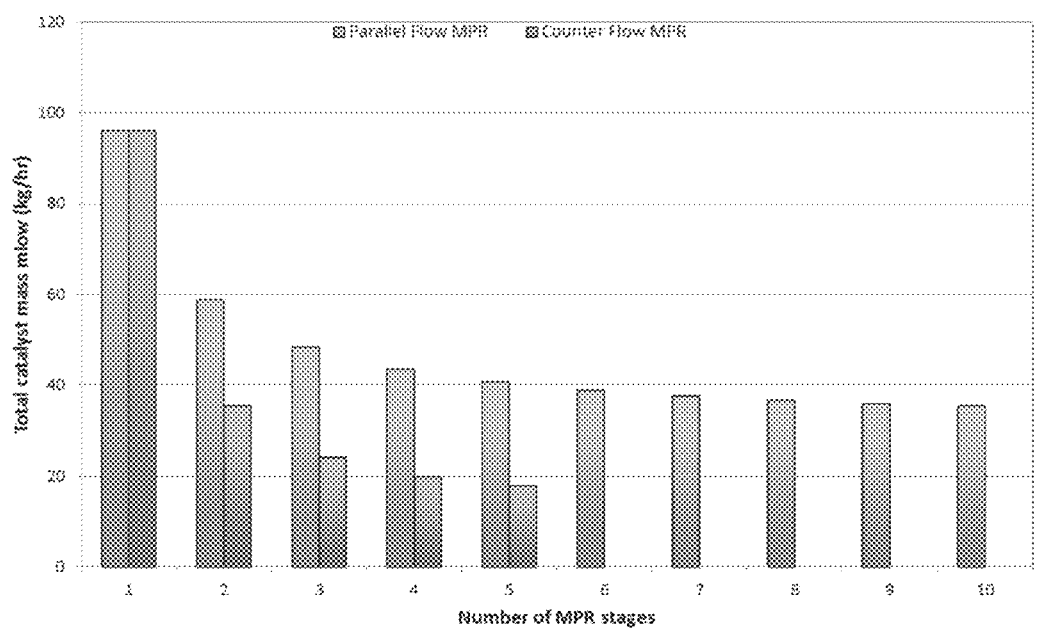
FIG. 12 is a graphical representation of the mass balance calculation results of both the counter-current MPR and parallel MPR showing the catalyst mass-flow required for a balanced system with a hydrogen production rate of 2000 m$^3$/hr.

The empirical results using the linear extrapolated values for pressures above 9 bar(abs) are graphically demonstrated in FIG. 12. These results show that the counter flow MPR would consume considerably less catalyst than the parallel flow process under all scenarios. The counter-flow process with 5 reaction stages requires only 19% of the catalyst required for a single reactor, whereas the parallel-flow process requires 42% with the same number of stages. The counter-flow process however is only able to have a maximum of 5 reactor stages for the catalyst mass flow to be constant for all stages. In contrast, the number of parallel-flow process stages is limitless; however it can be seen that each stage has diminishing returns and overall require significantly more catalyst than the counter-flow option. The catalyst mass flow rates are calculated based on an assumed hydrogen output flow rate of 2000 m³/hr.

Example 3

Beneficiation of Iron Ore.
Experimental Details

Typical low grade iron ore rock consists of distinct sections of high grade iron oxide and low grade counterpart. This type of rock is known as banded iron formation (BIF). A 6.39 g sample of BIF iron ore was prepared, an analysis of the characteristics are shown in Table 3.

TABLE 3

Sample Analysis

| | OXIDE | | | | | | | | | | |
|---|---|---|---|---|---|---|---|---|---|---|---|
| | $SiO_2$ | $T_1O_2$ | $Al_2O_3$ | $Fe_2O_3$ | $Mn_3O_4$ | MgO | CaO | $Na_2O$ | $K_2O$ | $P_2O_5$ | $SO_3$ |
| Iron ore rich section | 10.62 | 0.06 | 0.11 | 88.8 | 0.01 | 0.12 | 0.02 | 0.23 | 0.01 | 0.03 | <0.01 |
| Iron ore poor section | 84.1 | 0.04 | 0.14 | 12.9 | <0.01 | 0.07 | 0.21 | 0.11 | 0.03 | 0.02 | <0.01 |

TABLE 3-continued

Sample Analysis

| | OXIDE | | | | | | | | | |
|---|---|---|---|---|---|---|---|---|---|---|
| | $Cr_2O_3$ | $ZrO_2$ | SrO | ZnO | CuO | NiO | BaO | PbO | L.O.I. | TOTAL |
| Iron ore rich section | 0.13 | 0.02 | 0.01 | <0.01 | 0.01 | 0.27 | <0.01 | <0.01 | 1.98 | 102.43 |
| Iron ore poor section | 0.21 | <0.01 | <0.01 | <0.01 | <0.01 | 0.43 | <0.01 | <0.01 | 1 | 99.26 |

The sample was loaded into a static reactor bed and was contacted at 900° C. with methane gas and atmospheric pressure for a period of 4 hours. Following reaction, the high grade iron oxide band had fragmented whereas the low grade counterpart was largely unaffected.

Without wishing to be bound by theory it is understood by the inventors that the first reaction that occurs is the reduction of the aggregate iron oxide species ore into iron carbide, emitting water vapour, H2, CO2 and trace CO. Continued reaction causes the aggregate iron carbide to fragment via metal dusting (as described earlier) and in the absence of oxides the system emits $H_2$ gas only. This dusting causes all the iron species to disintegrate into micron and nano fragments due to the encapsulating graphitic layers. The gangue of the iron ore (typically highly stable minerals containing $SiO_2$ and $Al_2O_3$) are unaffected by these process conditions and remain intact and unaltered. The product of the process is therefore left with larger aggregates of gangue and tiny particles of graphite encapsulated ferric iron/iron carbide. The size and density difference between the iron species and the gangue can then be exploited to separate the two through physical screening.

The compositional data of the samples after the reaction and physical separation by size is shown in Table 4.

carbide by a process called methanation. In this reaction the iron/carbon particles are contacted with hydrogen gas at elevated temperatures, to form methane gas by way of the following reaction 2.

$$C+2H_2.CH_4 \qquad (2)$$

As the iron particles are very small and this reaction is exothermic the iron particles agglomerate to form larger particles of pure iron.

It is envisaged that the graphitic carbon can then be removed from the graphite encapsulated ferric iron/iron carbide by contacting at 800° C. and 20 bar the graphite encapsulated ferric iron/iron carbide with hydrogen gas.

The advantages of the beneficiation method of the present invention over classical methods of iron ore beneficiation is that the produced iron oxide species are reduced (oxygen removed leaving ferric iron) in addition to the gangue being removed. This reduced iron is 90-95% wt iron whereas high grade iron ore is typically 55-63% wt (70% theoretical maximum). Reduced iron is a premium product compared to iron ore and thus commands a higher price. Also, the reduced iron product potentially has lower transportation

TABLE 4

Sample Analysis

| | OXIDE WT % | | | | | | | | | |
|---|---|---|---|---|---|---|---|---|---|---|
| | $SiO_2$ | $T_1O_2$ | $Al_2O_3$ | $Fe_2O_3$ | $Mn_3O_4$ | MgO | CaO | $Na_2O$ | $K_2O$ | $P_2O_5$ |
| Sample A | 11 | 0.05 | 0.12 | 89.05 | <0.01 | 0.13 | 0.02 | 0.21 | 0.02 | 0.04 |
| Sample B | 79.13 | <0.01 | 0.14 | 19.72 | <0.01 | 0.11 | 0.06 | 0.08 | 0.05 | 0.03 |

| | OXIDE WT % | | | | | | | | | |
|---|---|---|---|---|---|---|---|---|---|---|
| | $SO_3$ | $Cr_2O_3$ | $ZrO_2$ | SrO | ZnO | NiO | BaO | PbO | CuO | Total |
| Sample A | <0.01 | 0.05 | 0.02 | 0.01 | <0.03 | 0.08 | <0.01 | <0.01 | 0.07 | 100.87 |
| Sample B | <0.01 | <0.01 | <0.01 | <0.01 | <0.01 | <0.01 | <0.01 | <0.01 | <0.01 | 99.29 |

The analysis showed that the size separation was able to separate the majority of the iron species, with sample A corresponding to the majority of iron. The compositional data was determined by XRF analysis, which requires the sample to be oxidised beforehand, thus showing all iron species as oxides instead of ferrite. Energy-dispersive X-ray spectroscopy analysis prior to calcination showed the iron species to be ferrite. Empirically, removing this oxide from the iron composition we are able to calculate that the process is able to extract a product that is 85 wt % iron from an original total rock composition of approximately 35 wt %.

It is envisaged that the graphitic carbon can then be removed from the graphite encapsulated ferric iron/iron costs because ballast oxygen is not transported—a saving of 30-40% by weight and ~50% by volume. Classical beneficiation processes used in industry for iron ore include milling, magnetic separation, floatation, gravity concentration, thickening/filtering and agglomeration.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all.

The invention claimed is:

1. A process for producing hydrogen and graphitic carbon from a hydrocarbon gas comprising:
    contacting at a temperature between 600° C. and 1000° C. a catalyst with the hydrocarbon gas to catalytically convert at least a portion of the hydrocarbon gas to hydrogen and graphitic carbon,
wherein the catalyst is a low grade iron oxide;
wherein reacted catalyst is reduced and wherein unreacted catalyst is non-reduced;
wherein the hydrocarbon gas is selected from the group consisting of methane, ethane, ethylene, propane, butane, and a mixture thereof; and
wherein upon contact with the hydrocarbon gas the non-reduced catalyst fragments into micro- and nano-scale fragments from inter-granular pressure caused by graphite precipitation.

2. The according to claim 1, conducted at a pressure greater than atmospheric pressure.

3. The process according to claim 1, wherein the pressure is 0 bar to 100 bar.

4. The process according to claim 1, wherein the temperature is between 700° C. and 950° C.

5. The according to claim 1, wherein the temperature is between 800° C. and 900° C.

6. The according to claim 1, wherein the temperature is between 650° C. and 750° C.

7. The according to claim 1, wherein the hydrocarbon gas is methane.

8. The process according to claim 1, wherein, the contacting the catalyst with the hydrocarbon gas is performed in a plurality of pressurized reactors arranged in series.

9. The process according to claim 8, wherein the reactors are arranged in series to allow hydrocarbon gas to flow from a first reactor to a subsequent reactor and each subsequent reactor in the series operates at a lower pressure than the reactor preceding it, allowing hydrocarbon gas to travel to reactors of lower pressure.

10. The process according to claim 9, wherein each reactor is provided with unreacted catalyst.

11. The process according to claim 8, wherein the reactors are arranged in series to allow for both the hydrocarbon gas and catalyst to flow between reactors in opposite directions.

12. The process according to claim 11, wherein unreacted catalyst is provided in the reactor of lowest pressure and unreacted hydrocarbon gas is provided in the reactor of highest pressure and catalyst is transferred between the reactors counter-currently to gas flow between the reactors.

13. A process for producing hydrogen and graphitic carbon from a hydrocarbon gas comprising:
    contacting at a temperature between 600° C. and 1000° C. a catalyst with the hydrocarbon gas to catalytically convert at least a portion of the hydrocarbon gas to hydrogen and graphitic carbon,
    wherein the catalyst is a low grade iron oxide,
    wherein, the contacting the catalyst with the gas is performed in a plurality of pressurized reactors arranged in series, and
    wherein the reactors are arranged in series to allow catalyst to flow from a first reactor to a subsequent reactor and each subsequent reactor in the series is operated at a higher pressure than the reactor preceding it, allowing catalyst to travel to reactors of higher pressure.

14. The process according to claim 13, wherein unreacted hydrocarbon gas is provided to each reactor.

15. The method of claim 13 wherein reacted catalyst is reduced and wherein unreacted catalyst is non-reduced.

16. The method of claim 15 wherein upon contact with the hydrocarbon gas the non-reduced catalyst fragments into micro- and nano-scale fragments from inter-granular pressure caused by graphite precipitation.

* * * * *